US012615298B2

(12) United States Patent
Singal et al.

(10) Patent No.: US 12,615,298 B2
(45) Date of Patent: Apr. 28, 2026

(54) REACTIVE HARD ZONING IN STORAGE ENVIRONMENTS

(71) Applicant: DELL PRODUCTS L.P., Round Rock, TX (US)

(72) Inventors: Pawan Kumar Singal, Milpitas, CA (US); Balaji Rajagopalan, Sunnyvale, CA (US); Erik Smith, Douglas, MA (US); Badrinath Viswanathan, Chennai (IN); Balaji Thope Janakiram, Bangalore (IN); Shanmugapriya Sakthirajan, Chennai (IN)

(73) Assignee: Dell Products, L.P., Round Rock, TX (US)

( * ) Notice: Subject to any disclaimer, the term of this patent is extended or adjusted under 35 U.S.C. 154(b) by 106 days.

(21) Appl. No.: 18/468,371

(22) Filed: Sep. 15, 2023

(65) Prior Publication Data

US 2025/0097269 A1     Mar. 20, 2025

(51) Int. Cl.
H04L 9/40          (2022.01)

(52) U.S. Cl.
CPC ............ H04L 63/20 (2013.01); H04L 63/101 (2013.01); H04L 63/1408 (2013.01)

(58) Field of Classification Search
CPC .... H04L 63/20; H04L 63/101; H04L 63/1408
USPC .......................................................... 726/1
See application file for complete search history.

(56) References Cited

U.S. PATENT DOCUMENTS

| | | | |
|---|---|---|---|
| 6,625,625 | B1 | 9/2003 | Kihara et al. |
| 7,185,334 | B2 | 2/2007 | Bourke-Dunphy et al. |
| 7,697,920 | B1 | 4/2010 | Mcclain |
| 8,375,014 | B1 | 2/2013 | Brocato et al. |
| 9,384,093 | B1 | 7/2016 | Aiello |
| 9,516,108 | B1 | 12/2016 | Sullivan et al. |

(Continued)

OTHER PUBLICATIONS

"FC and FCoE versus iSCSI—"Network-centric" versus "End-Node-centric" provisioning," [online], [Retrieved Oct. 12, 2020]. Retrieved from Internet <URL: https://brasstacksblog.typepad.com/brass-tacks/2012/02/fc-and-fcoe-versus-iscsi-network-centric-versus-end-node-centric-provisioning.html> (6pgs).

(Continued)

*Primary Examiner* — Anthony D Brown
(74) *Attorney, Agent, or Firm* — BAUGH LAW, LLC

(57)          ABSTRACT
Presented herein are systems and methods for reactive hard zoning. In one or more embodiments, a monitoring and visibility services (MVS) controller receives zoning information from a centralized discovery controller and also receives data traffic flow information from traffic samplers that continuously monitor network traffic flows (e.g., using SFLOW) in the network. Responsive to the MVS detecting a violating data traffic flow (i.e., zoning configuration does not allow a host to access a storage port), an enforcement engine of the MVS may cause one or more actions to be taken relative to the detected violation. An action may comprise adding a networking configuration (e.g., ACL or disable (a.k.a., fence) the interface on the switch that the host is attached to) to deny that communication, flagging the communication, etc. The network configuration may be reset to a default policy either automatically (e.g., timeout) or manually via administrative configuration.

20 Claims, 9 Drawing Sheets

(56) References Cited

U.S. PATENT DOCUMENTS

| | | | |
|---|---|---|---|
| 10,225,138 | B2 | 3/2019 | Wu et al. |
| 10,372,926 | B1 | 8/2019 | Leshinsky et al. |
| 10,771,340 | B2 | 9/2020 | Ballapuram |
| 10,877,669 | B1 | 12/2020 | Sivasubramanian et al. |
| 11,163,716 | B2 | 11/2021 | Smith et al. |
| 11,240,308 | B2 | 2/2022 | Smith et al. |
| 11,323,355 | B1 | 5/2022 | Gupta et al. |
| 11,442,652 | B1 | 9/2022 | Dailey et al. |
| 11,451,470 | B2 | 9/2022 | Power et al. |
| 11,487,690 | B2 | 11/2022 | Puttagunta et al. |
| 11,489,723 | B2 | 11/2022 | Smith et al. |
| 11,520,518 | B2 | 12/2022 | Desanti et al. |
| 11,543,966 | B1 | 1/2023 | Varghese et al. |
| 11,550,734 | B1 | 1/2023 | Matosevich et al. |
| 11,579,808 | B2 | 2/2023 | Satapathy et al. |
| 11,614,970 | B2 | 3/2023 | Huang et al. |
| 11,625,273 | B1 | 4/2023 | Elhemali et al. |
| 11,675,499 | B2 | 6/2023 | Dhatchinamoorthy et al. |
| 11,805,171 | B2 | 10/2023 | Smith et al. |
| 11,818,031 | B2 | 11/2023 | Smith et al. |
| 11,822,545 | B2 | 11/2023 | Cappiello et al. |
| 11,907,530 | B2 | 2/2024 | Desanti et al. |
| 12,026,402 | B2 | 7/2024 | Paulchamy et al. |
| 12,086,431 | B1 | 9/2024 | Dreier et al. |
| 2002/0016921 | A1 | 2/2002 | Olsen et al. |
| 2004/0097217 | A1 | 5/2004 | Mcclain |
| 2006/0242320 | A1 | 10/2006 | Nettle et al. |
| 2007/0299880 | A1 | 12/2007 | Kawabe et al. |
| 2009/0225351 | A1 | 9/2009 | Lacagnina |
| 2010/0199330 | A1 | 8/2010 | Schott et al. |
| 2012/0254554 | A1 | 10/2012 | Nakajima |
| 2013/0297835 | A1 | 11/2013 | Cho |
| 2015/0038076 | A1 | 2/2015 | Naruse et al. |
| 2016/0241659 | A1 | 8/2016 | Wessendorf et al. |
| 2017/0048322 | A1 | 2/2017 | Desanti |
| 2017/0315522 | A1 | 11/2017 | Kwon et al. |
| 2018/0074717 | A1 | 3/2018 | Olarig |
| 2018/0074984 | A1 | 3/2018 | Olarig et al. |
| 2018/0270119 | A1 | 9/2018 | Ballapuram |
| 2019/0020603 | A1 | 1/2019 | Subramani et al. |
| 2019/0037033 | A1 | 1/2019 | Khakimov et al. |
| 2019/0042144 | A1 | 2/2019 | Peterson et al. |
| 2019/0047841 | A1 | 2/2019 | Chang et al. |
| 2019/0245924 | A1 | 8/2019 | Li |
| 2019/0318734 | A1 | 10/2019 | Nair |
| 2019/0332766 | A1 | 10/2019 | Guri et al. |
| 2019/0334949 | A1 | 10/2019 | Guri et al. |
| 2020/0065269 | A1 | 2/2020 | Balasubramani |
| 2020/0081640 | A1 | 3/2020 | Enz |
| 2020/0136996 | A1 | 4/2020 | Li et al. |
| 2020/0310657 | A1 | 10/2020 | Cayton |
| 2020/0319812 | A1 | 10/2020 | He |
| 2020/0349094 | A1 | 11/2020 | Smith et al. |
| 2020/0409893 | A1 | 12/2020 | Puttagunta |
| 2021/0019272 | A1 | 1/2021 | Olarig et al. |
| 2021/0028987 | A1 | 1/2021 | Krivenok |
| 2021/0037105 | A1 | 2/2021 | Smith-Denny et al. |
| 2021/0064281 | A1 | 3/2021 | Satapathy et al. |
| 2021/0124695 | A1 | 4/2021 | Jaiswal |
| 2021/0126861 | A1* | 4/2021 | Rajendiran ........... H04L 61/103 |
| 2021/0286540 | A1 | 9/2021 | Tylik et al. |
| 2021/0286741 | A1 | 9/2021 | Smith et al. |
| 2021/0286745 | A1 | 9/2021 | Smith et al. |
| 2021/0288878 | A1 | 9/2021 | Smith et al. |
| 2021/0289027 | A1 | 9/2021 | Smith et al. |
| 2021/0289029 | A1 | 9/2021 | Smith et al. |
| 2021/0311899 | A1* | 10/2021 | Smith ................ G06F 13/4295 |
| 2021/0391988 | A1 | 12/2021 | Bedau et al. |
| 2021/0397351 | A1 | 12/2021 | Dhatchinamoorthy et al. |
| 2022/0014592 | A1 | 1/2022 | Kachare et al. |
| 2022/0027076 | A1 | 1/2022 | Reichbach et al. |
| 2022/0030062 | A1 | 1/2022 | Jennings et al. |
| 2022/0066799 | A1 | 3/2022 | Pinto et al. |
| 2022/0174094 | A1 | 6/2022 | Subbiah et al. |
| 2022/0237274 | A1 | 7/2022 | Paul et al. |
| 2022/0286377 | A1 | 9/2022 | Smith et al. |
| 2022/0286508 | A1 | 9/2022 | Smith et al. |
| 2023/0035799 | A1 | 2/2023 | Desanti |
| 2023/0305700 | A1 | 9/2023 | Desanti et al. |
| 2023/0325200 | A1 | 10/2023 | Desanti et al. |
| 2024/0020055 | A1 | 1/2024 | Desanti et al. |
| 2024/0020056 | A1 | 1/2024 | Desanti et al. |
| 2024/0020057 | A1 | 1/2024 | Paulchamy et al. |

OTHER PUBLICATIONS

"NVMe over Fabrics' Discovery problem," [online], [Retrieved Oct. 12, 2020] Retrieved from Internet <URL: https://brasstacksblog.typepad.com/brass-tacks/2017/12/nvme-over-fabrics-discovery-problem.html> (2pgs).

"Hard zoning versus soft zoning in a Fc/FCoE SAN," [online], [Retrieved Oct. 12, 2020] Retrieved from Internet <URL: https://brasstacksblog.typepad.com/brass-tacks/2012/01/hard-zoning-versus-soft-zoning-in-a-fcfcoe-san.html> (5pgs).

"NVM Express Over Fabrics," revision 1.0, May 31, 2016, [online], [Retrieved Oct. 12, 2020] Retrieved from Internet <URL:http://nvmexpress.org> (49pgs).

"NVM Express Over Fabrics," revision 1.1, Oct. 22, 2019, [online], [Retrieved Oct. 12, 2020] Retrieved from Internet <URL:http://nvmexpress.org> (83pgs).

"NVM Express Base Specification," revision 1.4, Jun. 10, 2019, [online], [Retrieved Oct. 12, 2020] Retrieved from Internet <URL:http://nvmexpress.org> (403pgs).

Claudio Desanti, "Subsystem Driven Zoning with Pull Registration Model," NVM Express, Feb. 1, 2022. (8pgs).

Erik Smith et al., "NVM Express Technical Proposal (TP) 8010," NVM Express, Jan. 12, 2022. (82 pgs).

Erik Smith et al., "NVM Express Technical Proposal (TP) 8010a," NVM Express, May 9, 2022. (80 pgs).

Erik Smith, "NVM Express Technical Proposal for New Feature," NVM Express, Dell EMC, Jan. 11, 2022. (9 pgs).

INCITS 548-2020, Information Technology—Fibre Channel—Generic Services—8 (FC-GS-8), American National Standard for Information Technology, 2020 (431 pages).

NVM Express TM over Fabrics, Revision 1.1a, Jul. 12, 2021, [online], [Retrieved Jan. 12, 2024]. Retrieved from Internet 2021. (84 pgs).

NVMe-oF™: Discovery Automation for NVMe® IP-based SANs, SNIA NSF Networking Storage, Nov. 2021. (49pgs).

* cited by examiner

500

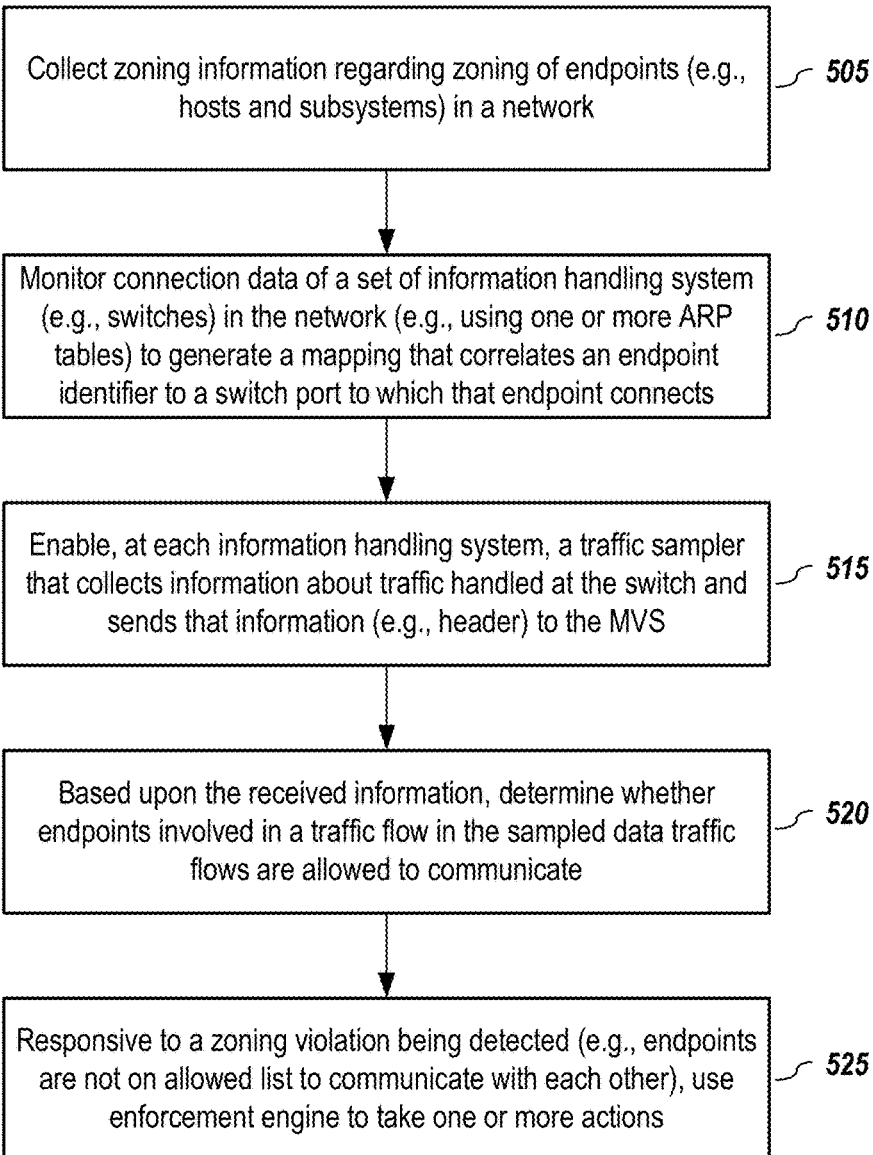

Collect zoning information regarding zoning of endpoints (e.g., hosts and subsystems) in a network ⟳ 505

Monitor connection data of a set of information handling system (e.g., switches) in the network (e.g., using one or more ARP tables) to generate a mapping that correlates an endpoint identifier to a switch port to which that endpoint connects ⟳ 510

Enable, at each information handling system, a traffic sampler that collects information about traffic handled at the switch and sends that information (e.g., header) to the MVS ⟳ 515

Based upon the received information, determine whether endpoints involved in a traffic flow in the sampled data traffic flows are allowed to communicate ⟳ 520

Responsive to a zoning violation being detected (e.g., endpoints are not on allowed list to communicate with each other), use enforcement engine to take one or more actions ⟳ 525

REACTIVE HARD ZONING IN STORAGE ENVIRONMENTS

BACKGROUND

A. Technical Field

The present disclosure relates generally to information handling systems. More particularly, the present disclosure relates to handling data access in storage networks.

B. Background

The subject matter discussed in the background section shall not be assumed to be prior art merely as a result of its mention in this background section. Similarly, a problem mentioned in the background section or associated with the subject matter of the background section should not be assumed to have been previously recognized in the prior art. The subject matter in the background section merely represents different approaches, which in and of themselves may also be inventions.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Soft zoning provides security against unauthorized access to ports or nodes in a storage network fabric by restricting access based on membership of those devices in one or more predefined zones.

Soft zoning protection typically involves communicating with a name server, in which a name service request is made that seeks address information for a target storage device. Based on the request or query, zoning information is retrieved based upon an appropriate entry in a name server database, which indicates the availability and permission of devices to communicate with each other. The returned information either provides information that facilities the interaction between endpoints (e.g., a host and a storage subsystem) or the host is not provided with information about a target storages subsystem and therefore cannot connect—thereby enforcing the zoning restriction.

This mechanism provides a simple means for restricting access. In other words, an endpoint device that requests access to a target device will see the target device only if both the endpoint device and the target device are in the same zone. However, soft zoning is based on an honor system that, when violated, may cause network instability and reduce available bandwidth. While potential network instability and reduced bandwidth can be significant concerns, one of the biggest issues with soft zoning is that it does not prevent a host from connecting to a storage port and potentially accessing data that the host has not been allowed to access. Such unauthorized access may represent a serious security breach.

In comparison, hard zoning provides additional security against unauthorized access by using a network information handling system (e.g., a switch) to perform data traffic filtering to actively prevent access between devices that belong to different zones in the storage network fabric. However, hard zoning suffers from several issues.

First, hard zoning has limited scalability. Hard zoning requires explicitly defining and managing zones for each host and storage system. As the number of hosts and storage systems grows, the zone complexity increases significantly. The increase in complexity makes it difficult for management and runs into resource limitations, which is true for both soft zoning and hard zoning. For example, a network switch has limited resources (e.g., Ternary Content Addressable Memory (TCAM)) for zoning rules. TCAM typically is an expensive component and a scarce resource on many switches. The limited size of the switches' TCAMs or other hardware-based functionality that is used to store and process Access Control Entries (ACE) creates scaling issues. If an ACE was created for every host and storage pair by default, the switches would quickly run out of space. These resource and management limitations make it challenging to scale the infrastructure efficiently.

Second, related to the prior issue is the administrative overhead. Configuring and maintaining hard zoning manually can be a time-consuming task, especially in large-scale deployments. This administrative overhead is not insubstantial, and any changes to the configuration might lead to downtime or misconfigurations.

Finally, there is added complexity and risk of errors. Identifying and resolving connectivity issues becomes more complicated with hard zoning. Any mistakes in the zoning setup or changes to the configuration can lead to connectivity problems that are challenging to diagnose. And, because hard zoning tends to be manually configured, there is an increased risk of problems due to human errors.

Accordingly, it is highly desirable to find flexible but secure and efficient ways to handle zoning violations in storage network fabrics.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

FIG. 5 depicts a general methodology for reactive hard zoning, according to embodiments of the present disclosure.

DETAILED DESCRIPTION OF EMBODIMENTS

Figure 1:
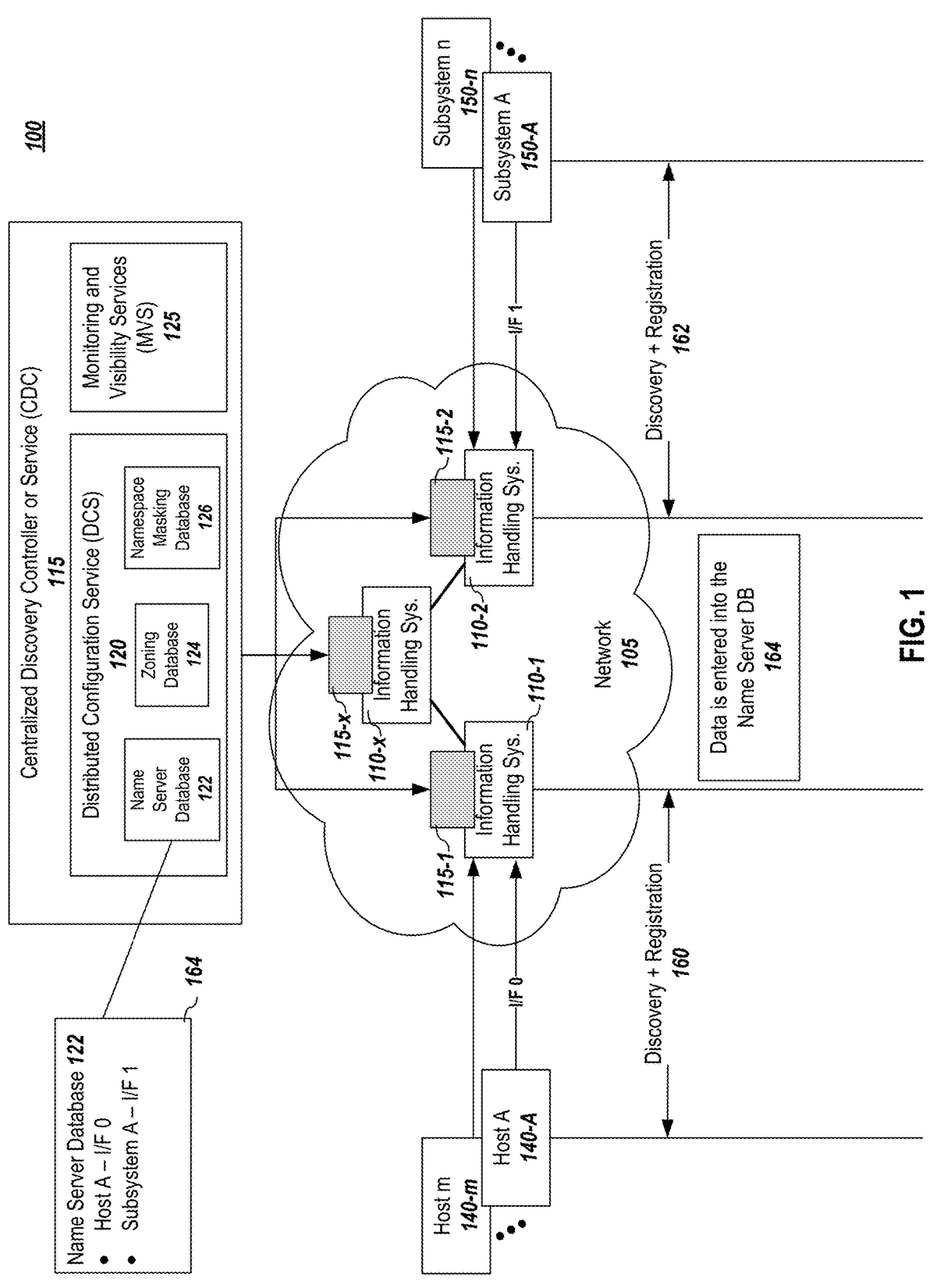
FIG. 1 depicts an example Non-Volatile Memory express over Fabric (NVMe-oF) system with a centralized configuration repository, according to embodiments of the present disclosure.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "packet" or "frame" shall be understood to mean a group of one or more bits. The term "frame" shall not be interpreted as limiting embodiments of the present invention to Layer 2 networks; and, the term "packet" shall not be interpreted as limiting embodiments of the present invention to Layer 3 networks. The terms "packet," "frame," "data," or "data traffic" may be replaced by other terminologies referring to a group of bits, such as "datagram" or "cell." The words "optimal," "optimize," "optimization," and the like refer to an improvement of an outcome or a process and do not require that the specified outcome or process has achieved an "optimal" or peak state.

It shall be noted that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

It shall also be noted that although embodiments described herein may be within the context of storage networks, particularly Non-Volatile Memory Express® over Fabrics (NVMe-oF) environments, aspects of the present disclosure are not so limited. Accordingly, the aspects of the present disclosure may be applied or adapted for use in other contexts.

A. General Introduction

In one or more embodiments, in an NVMe-oF Internet Protocol (IP)-based storage area network (SAN), a Centralized Discovery Controller (CDC) may maintain a registry of end device or endpoint (e.g., hosts and/or storage subsystems) information that is provided to other NVMe end devices, typically via Discovery Log Pages (DLPs) based on zone policies that have been established (e.g., by a network administrator). This mechanism provides a means for a host device to connect (e.g., perform a NVMe connect command) to a storage subsystem and eventually use the storage services provided by it.

However, because NVMe environments typically operate using soft zoning, currently there are no mechanisms in place that prevent a host device from connecting to the IP address and NVMe Qualified Name (NQN) of the subsystem. That is, a host can perform an NVMe connect to access a storage subsystem even if that host has not been granted access to that storage system via a zoning policy.

To ensure hosts can only connect to the subsystems that they have been granted access to, the standard industry practice is to add access control rules/lists (ACLs) in underlaying networking infrastructure to deny any unwanted communication. If these ACLs are configured before each host attempts to connect, it can be thought of as proactive hardware-enforced zoning, which operates as a form of hard zoning. Hard zoning provides numerous advantages including ensuring the safety of data exchanges from the moment the ACLs are put in place. However, there are limitations with using ACLs for zone enforcement, particularly in NVMe-oF based deployments where the same switching infrastructure can be used for both SAN and local area network (LAN) traffic. Some of these limitations include the following.

First, the ACL resources on switch hardware are limited and may also need to be used for various other functions (e.g., quality of service (QoS), policy-based routing (PBR), etc.). Because of this limitation, not all of these resources may be available for zone enforcement.

Second, scaling of zoning information is limited by the number of ACL rules. For example, a storage network may have an upper bound of the number of endpoint devices it can support because only a certain number of ACL are supportable by the network infrastructure.

Third, deny rules are very rigid. To enforce hard zoning, typically all storage traffic is denied, and other traffic is selectively allowed based on zoning.

There are numerous reasons why it is important to allow a host to only access storage that has been provisioned to it. Among the most important is security. A rogue host should not be able to access a subsystem that it has not been formally granted permission to access. In a typical IP SAN deployment, most hosts are well behaved and do not connect to storage subsystems that they have not been zoned to access. However, in case there is a rogue host connected to the SAN, the network should provide a mechanism to isolate that host and block the traffic from that host. It should be noted that a rogue/non-well-behaved host may not be acting improperly for malicious reasons (e.g., genuine attack) or more innocent reasons (e.g., because of human configuration error). Regardless of the intent of the rogue host, mechanisms should be in place to prohibit such actions.

Accordingly, embodiments of a reactive hard-zoning framework are presented herein that provide means to address such situations. In one or more embodiments, data traffic on the network fabric may be monitored to identify for a traffic flow whether the host and subsystem(s) involved in the communication are allowed to correspond. If a host is not authorized to connect with a subsystem or subsystems, one or more actions may be taken to remedy the situation.

B. Reactive Hard Zoning Embodiments

1. Example Architecture and Topology Embodiments

The typical storage provisioning process involves the coordination of a storage administrator and/or a SAN administrator, who typically work together. Generally, the SAN administrator creates the zoning database, and the storage administrator allocates one or more namespaces to a zoned host.

Embodiments herein may comprise a (i.e., network-based) NVMe-oF namespace masking and configuration repository, which may be referenced herein as a distributed configuration service (DCS), which may be part of centralized discovery service or controller (CDC). By centralizing this functionality, there is no longer a requirement that each host, network element, and subsystem have its own robust user interface (UI). DCS embodiments provide a single UI for a number of features, including but not limited to:

(1) viewing the list of Host interfaces that are attached to the IP Network and are registered with a centralized discovery service or controller (CDC), of which the DCS may be communicatively connected with or may be part of the CDC;

(2) viewing the list of subsystem interfaces that are attached to the IP Network and are registered with the CDC or DCS;

(3) viewing the storage capacity available behind each subsystem interface; and (4) allowing a user to define the Host to Subsystem interface relationships as well as define how much storage should be allocated to each Host.

In one or more embodiments, a centralized configuration repository, referred to above as the DCS, uses the configuration information discussed above to perform various functions. For example, the centralized configuration repository may be used to generate the appropriate zones and zone groups that enable the appropriate connectivity between host and subsystem interfaces. In one or more embodiments, this centralized repository may be deployed as a service running under the control of a service (e.g., SFSS (SmartFabric Storage Software) provided by Dell, Inc. of Round Rock, Texas), which may also be referred herein as a centralized discovery controller or service (CDC). Embodiments of storage fabric services that may provide or support centralized discovery controller or services are disclosed in commonly-owned U.S. patent application Ser. No. 16/820,547, filed on 16 Mar. 2020, entitled "DISCOVERY CONTROLLER REGISTRATION OF NON-VOLATILE MEMORY EXPRESS (NVMe) ELEMENTS IN AN NVMe-OVER-FABRICS (NVMe-oF) SYSTEM," listing Erik Smith, Joseph White, David Black, and Raja Subbiah as inventors, which patent document is incorporated by reference herein in its entirety.

In one or more embodiments, a masking definition may be generated in the centralized configuration repository, which may be provided to each subsystem interface as configuration changes are made. These changes may be communicated to the subsystem interface by either: a notification (e.g., an AEN (Asynchronous Event Notification)), in which, upon reception of the AEN, the subsystem retrieves the masking definition; or by a push notification from the DCS to the subsystem interface via an NVMe-oF or NVMe-oF-like command.

In one or more embodiments, these notifications may be done using in-band commands. By using in-band commands, embodiments drastically reduce interoperability concerns, eliminate the need for vendor-specific plugins, and eliminate the need to track NBI (North Bound Interface) addresses and credentials.

Embodiments also support the configuration of groups of very simple/small subsystems (e.g., EBOFs) in a scalable way. In other words, users need not configure each EBOF individually.

FIG. 1 depicts an example Non-Volatile Memory express over Fabric (NVMe-oF) system with a centralized configuration repository, according to embodiments of the present disclosure. Depicted in FIG. 1 is an NVMe-oF network 100, which comprises a number of host systems 140 connected to a network 105, and a number of subsystems (or storage subsystems) 150 also connected to the network 105. The network 105 comprises a fabric of information handling systems 110 (e.g., switches).

In one or more embodiments, one or more information handling systems 110 comprise a centralized configuration repository, which may be referred to herein as a distributed configuration service (DCS) 120. In one or more embodiments, the DCS 120 may be part of a centralized discovery service or controller (e.g., CDC 115); alternatively, the DCS 120 and the CDC 115 may be separate services that communicate. In one or more embodiments, the CDC 115 may be located at a single information handling system or may be distributed to a plurality of information handling systems.

As illustrated in FIG. 1, the DCS 120 comprises three databases-a name server database 122, a zoning database 124, and a namespace masking database 126. The function or use of each database is discussed in more detail below.

FIG. 1 also depicts a method flow, according to embodiments of the present disclosure. The method flow will be illustrated in terms of host A 140-A and subsystem A 150-A; however, it should be noted that the method flow may be performed with any number of hosts and any number of subsystems. As illustrated, host and storage discover (160 and 162) the centralized discovery controller or service (CDC) 115 and/or the distributed configuration service (DCS) 120 and registers their information with the service. It shall be noted that discovery and registration may be performed explicitly or implicitly in any numbers of ways, including as part of logins, direct configuration (e.g., command line interface), multicast DNS (domain name server), an underlying protocol (such as DHCP), software defined storage, etc. Embodiments of centralized storage fabric services, such as registration, including explicit and implicit registration, are disclosed in commonly-owned U.S. patent application Ser. No. 16/898,216, filed on 10 Jun. 2020, entitled "IMPLICIT DISCOVERY CONTROLLER REGISTRATION OF NON-VOLATILE MEMORY EXPRESS (NVME) ELEMENTS IN AN NVME-OVER-FABRICS (NVME-OF)," listing Erik Smith, Joseph White, David Black, and Raja Subbiah as inventors, and in commonly-owned U.S. patent application Ser. No. 16/820,547, filed on 16 Mar. 2020, entitled "DISCOVERY CONTROLLER REGISTRATION OF NON-VOLATILE MEMORY EXPRESS (NVMe) ELEMENTS IN AN NVMe-OVER-FABRICS (NVMe-oF) SYSTEM," listing Erik Smith, Joseph White, David Black, and Raja Subbiah as inventors. Each of the aforementioned patent documents are incorporated by reference herein in its entirety.

Regardless of the underlying mechanism for discovery and registration, the DCS 120 receives information about elements attached to the network 105 and includes (or registers) 164 their information into a name server database 122. For sake of illustration, an expanded view of the name server database 122 is shown with entries resulting from the discovery registration processes 164. Note that the entry shows host A—interface 0 and subsystem A—interface 1 have entries in the name server database.

In one or more embodiments, the DCS 120, which is now aware of subsystem A 150-A due to its registration in the name server database 122, may send a request to receive a listing of namespaces for subsystem A 150-A. In one or more embodiments, this request may be in the form of a command such as "get namespace list." In response to the request, the subsystem A 150-A may return a listing of relevant interfaces and the namespaces that can be accessed via those interfaces. For example, the subsystem 150A may return interfaces 1 through 10 as being its interfaces and that namespace identifiers NSID 46-58 are available via those interfaces. In one or more embodiments, the returned information may also include the amount of available storage.

Figure 2:
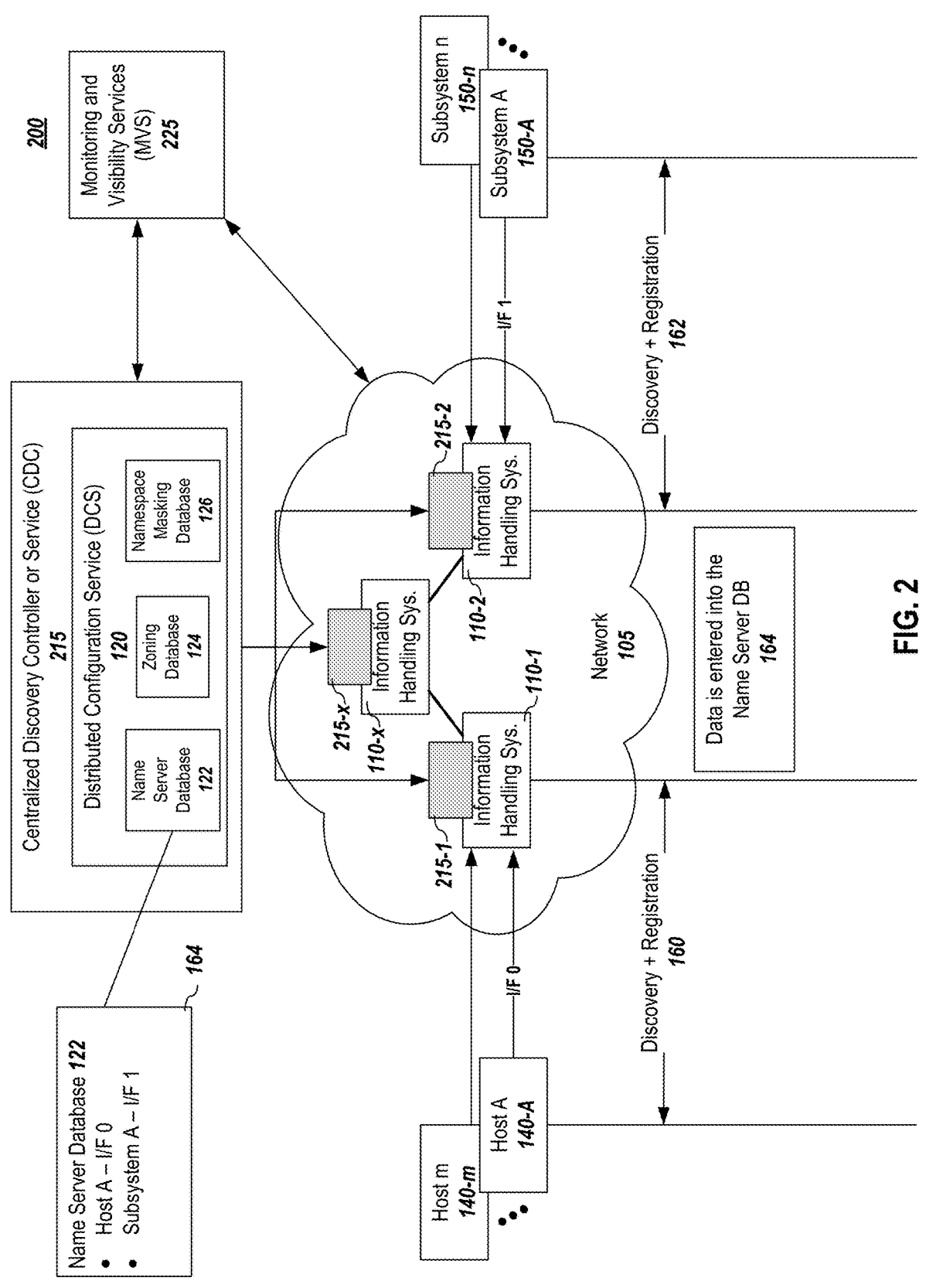
FIG. 2 depicts a network in which the monitoring and visibility service controller is separate from a centralized discovery controller, according to embodiments of the present disclosure.

Also depicted in FIG. 1 is a monitoring and visibility services (MVS) module 125. In the embodiment depicted in FIG. 1, the MVS 125 is part of the centralized discovery service or controller (e.g., CDC 115). However, alternatively, the MVS 125 may be separate services that interact with other components (e.g., CDC 115 and/or DCS 120). FIG. 2 depicts a network 200 in which the MVS 225 is not incorporated or included with the CDC 215, according to embodiments of the present disclosure. Note that MVS 125/225 may be located at a single network location or may be distributed.

The architectures/topologies depicted in the figures are provided only by way of example and not limitation. One skilled in the art shall recognize that a number of different architectures and/or network topologies may utilize the reactive hard zoning frameworks presented herein.

2. Zoning Database/Datastore Embodiments a) CDC Zoning Datastore Embodiments

Figure 3:
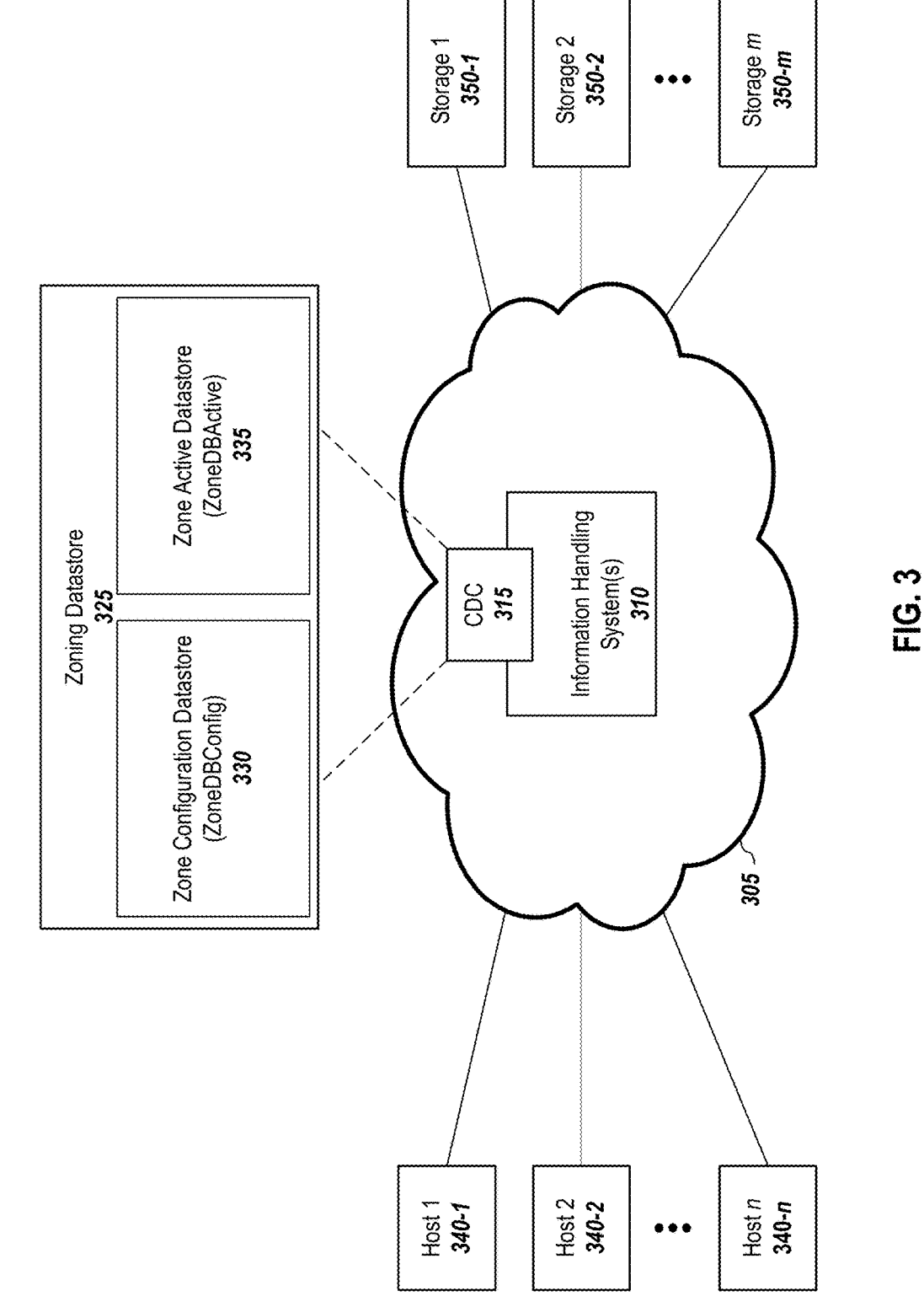
FIG. 3 depicts a network 305 that comprises a centralized zoning datastore 325, according to embodiments of the present disclosure.

FIG. 3 depicts a network 305 that comprises a centralized zoning datastore 325, according to embodiments of the present disclosure. In one or more embodiments, the centralized zoning datastore may be part of the zoning database 124 (FIG. 1 or FIG. 2). The CDC 315 represents an entity that maintains the pertinent fabric information and provides a single or centralized management interface for control and management of the NVMe over Fabrics (NVMe-oF) network. In one or more embodiments, one or more information handling systems 310 within a network, such as a cloud environment, comprise or support the CDC 315, which comprises or has access to the zoning datastore 325 that helps facilitate zoning and zoning related functions. Also depicted in FIG. 3 are hosts 340-$x$ and storage devices 350-$y$ that may be configured for access between different endpoints/end devices according to zoning.

In one or more embodiments, the zoning database or datastore 325 may comprise a zone configuration datastore (ZoneDBConfig) 330 and a zone active datastore (ZoneDBActive) 335. ZoneDBConfig 330 represents where zone groups may be configured, modified, deleted, etc., and the ZoneDBActive 335 indicates the zone group(s) that are enforced.

b) Zone Active Datastore (ZoneDBActive) Embodiments

A ZoneDBActive 335 may indicate the zone groups that are active. In one or more embodiments, a zone group may include one or more zones, members, aliases, attributes, etc. Note that, unlike typical zoning that only allows one active access control policy to be active at once, more than one zone group may be active at a time, which provides greater granularity over the active zone groups. One zone group may be removed or changed without affecting the activation state of other active zone groups. Note that, in one or more embodiments, the ZoneDBActive may facilitate enforcement actions, such as log page filtering, event notifications, network-level restrictions, among other actions. The zone groups in the ZoneDBActive may be activated and enforced by the CDC in terms of filtering the discovery information provided to hosts and storage elements.

c) Zone Configuration Datastore (ZoneDBConfig) Embodiments

In one or more embodiments, the ZoneDBConfig 330 represents where non-active zone groups and/or zone aliases may be configured, stored, modified, deleted, etc. A zone alias provides a means to group one or more members together and enable referencing all its members through the zone alias name.

3. Reactive Hard Zoning Embodiments

Figure 4:
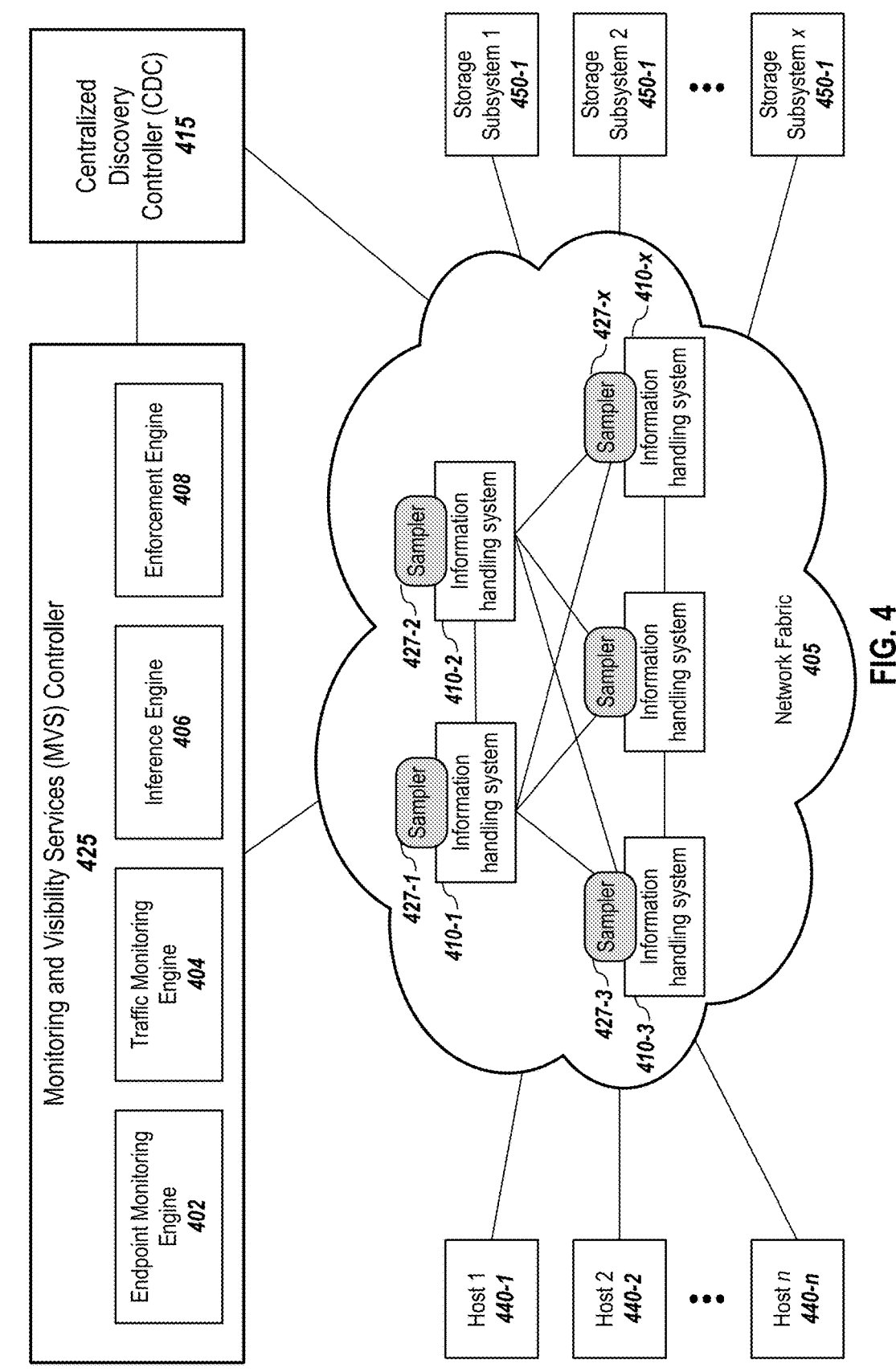
FIG. 4 depicts an example Non-Volatile Memory express over Fabric (NVMe-oF) system with a monitoring and visibility services (MVS) controller, according to embodiments of the present disclosure.

FIG. 4 depicts an example Non-Volatile Memory express over Fabric (NVMe-oF) system with a monitoring and visibility services (MVS) controller, according to embodiments of the present disclosure. Depicted in FIG. 4 is an NVMe-oF network 400, which comprises a number of host systems 440 connected to a network 405, and a number of subsystems (or storage subsystems) 450 also connected to the network 405. The network 405 comprises a fabric of information handling systems 410 (e.g., switches).

In one or more embodiments, the MVS 425 may comprise a number of functions or services. In the depicted embodiment, the MVS comprises an endpoint monitoring engine 402, a traffic monitoring engine 404, an inference engine 406, and an enforcement engine 408.

In one or more embodiments, the endpoint monitoring engine 402 builds and maintains a current list of allowed flows based on zoning information (e.g., name server database, zoning database, active zoning configurations database, etc.) that it receives from the CDC 415. For example, the MVS 425 may access information in one or more of the databases in the distributed configuration services of the CDC (see, e.g., DCS 120 of FIG. 2). In one or more embodiments, the MVS 425 may access zoning information by querying (e.g., using Application Programming Interfaces (APIs)) the CDC 415. Note that, in the depicted embodiment of FIG. 4, the MVS 425 is separate from the CDC 415; however, as noted previously, the MVS may be integrated with the CDC, and in such embodiments, the MVS may access the zoning information directly (i.e., without using APIs).

In one or more embodiments, the endpoint monitoring engine 402 may also build and maintain the endpoint-to-network-port binding information. For example, the endpoint monitoring engine 402 may use network device Address Resolution Protocol (ARP) cache or tables from the set of information handling system 410 in the network 405 to generate a mapping that correlates an endpoint identifier (e.g., IP address and/or NVMe Qualified Name (NQN)— although different identifiers may be used (e.g., fewer identifiers, more identifiers, custom identifiers, etc.)) to an information handling system's port to which that endpoint connects. Note that the endpoint monitoring engine may continually update based upon network and zoning changes.

In one or more embodiments, the traffic monitoring engine 404 samples data traffic flows. The traffic monitoring engine 404 may sample data traffic on all the ports identified in the mapping generated by the endpoint monitoring engine 402. To facilitate the sampling, a traffic sampler or sampler agent 427 may be used. For example, in the depicted embodiments, each of the information handling systems 410 in a set of information handling system of the fabric 405 may comprise a traffic sampler 427 for sampling data traffic flows and providing information related to that sampled data traffic to the traffic monitoring engine 404 of the monitoring and visibility services (MVS) controller 425. In one or more embodiments, the information collected by the sampler 427 may comprise the headers of data traffic flows, which include identifiers (e.g., IP address) of the source endpoint, the destination endpoint, or both.

In one or more embodiments, the samplers 427 may continuously monitor network traffic flows (e.g., using sFLOW or sFLOW-like sampling mechanisms). SFLOW stands for "sampled flow," and is a well-defined networking protocol. SFLOW provides a means for exporting data, together with interface counters, for the purpose of network monitoring. One skilled in the art shall recognize that other sampling means may be used. As explained in more detail below relative to FIG. 7, the traffic monitoring engine 404 may catalog each data traffic flow according to its direction (i.e., ingress flow or egress flow).

In one or more embodiments, the inferencing engine 406 examines the sampled flows against which flows are allowed based upon the zoning information. Responsive to detecting a zoning violation in which two endpoints are corresponding but are not authorized to correspond according to the zoning information, the inferencing engine 406 may flag any violating flows.

In one or more embodiments, the enforcement engine 408 may receive notification of a violating flow and, based on policy-based architecture, may take one or more actions related to the zoning violating flow. In one or more embodiments, a treatment may cause one or more the following actions to be taken: denying the violating flows (e.g., adding an Access Control List (ACL) rule), flagging the violating flows, fencing the network port (e.g., adding a networking configuration to affect (e.g., disable) the interface on the switch to which the host is communicatively attached), etc. In one or more embodiments, the enforcement engine 408 may reset any treatments based on a policy-based architecture (e.g., revert any network configuration changes due to violations after a certain time period) or manually via administrative configuration. By reverting/resetting, changes in zoning or in the network can be made but not blocked by the MVS. For example, two endpoints may not initially be allowed to correspond, but zoning may change and data traffic flow between the endpoints may be allowed. Continually updating the MVS 425 via the CDC 415 should adjust for this change, but in the event it does not, the problem is resolved by the reversion. If the reversion was improper, the normal operations of the MVS 425 will detect the violation and will re-institute an action to mitigate the violation.

FIG. 5 depicts a general methodology for reactive hard zoning, according to embodiments of the present disclosure. In one or more embodiments, a MVS may collect (505) from a CDC zoning information regarding zoning of endpoints (e.g., hosts and storage subsystems) in a network. In one or more embodiments, the step of collecting zoning information regarding zoning of endpoints in the network may comprise monitoring zoning information maintained at the CDC for any changes to zoning in the network and, responsive to detecting changes, updating information at the MVS to reflect the changes to zoning in the network.

In one or more embodiments, the MVS may also monitor (510) connection data of a set of information handling system in the network to generate a mapping that correlates an endpoint identifier to an information handling system's port to which that endpoint connects. The MVS may obtain information for the mapping from one or more Address Resolution Protocol (ARP) tables or caches of the information handling systems.

In one or more embodiments, the MVS may continually monitor the connection data of the set of information handling systems in the network, and, responsive to detecting changes, may update its information to reflect the changes to zoning.

In one or more embodiments, the MVS may enable (515) or use traffic samplers to obtain data traffic information. For example, from a sampler at each information handling system of a set of information handling systems in the network, the MVS may receive (515) information about data traffic handled by the information handling system. This information may be based upon header information and may identify a source IP address, a destination IP address, or both. The sampled information may include additional information, such as flags, NON, etc.

In one or more embodiments, based upon at least a portion of the collected information received from one or more of the information handling systems from the set of information handling systems, the MVS determines (520) whether endpoints involved in the data traffic are authorized to correspond according to the zoning information. Responsive to a zoning violation being detected in which two endpoints are corresponding but are not authorized to correspond according to the zoning information, the MVS may cause (525) one or more actions related to the zoning violation to be taken. As noted above, one or more actions that may be taken may include performing one or more of the following actions comprising: denying data traffic flow between two endpoints that are not authorized to correspond according to the zoning information; flagging data traffic flow between two endpoints that are not authorized to correspond according to the zoning information; and causing a fence to be added to a network port of an information handling system that is used in data traffic flow between two endpoints that are not authorized to correspond according to the zoning information.

Figure 6:
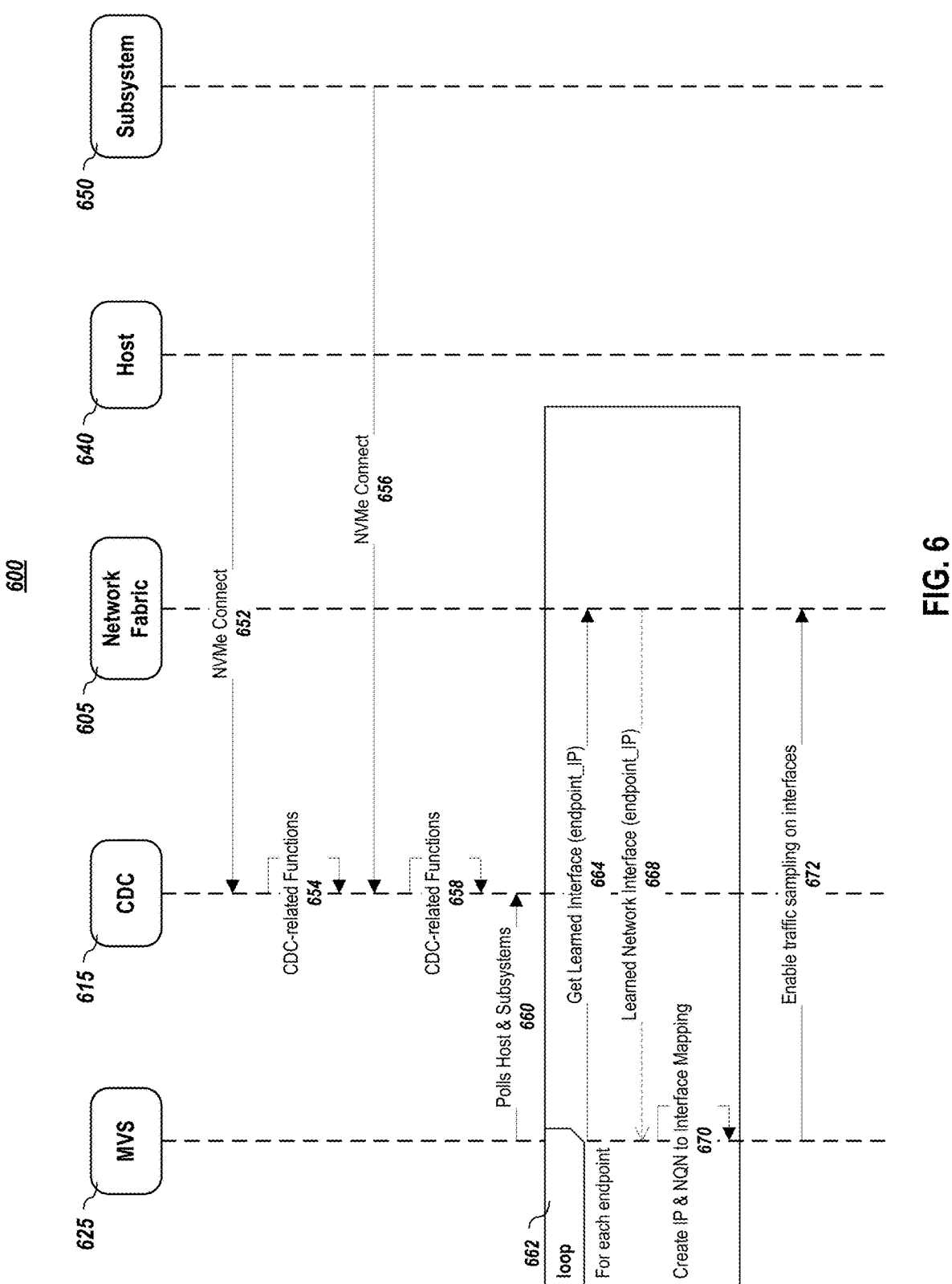
FIG. 6 displays an alternative depiction of initialization and monitoring of an MVS in an NVMe-OF network environment, according to embodiments of the present disclosure.

FIG. 6 displays an alternative depiction of initialization and monitoring of an MVS in an NVMe-OF network environment, according to embodiments of the present disclosure. As depicted, the endpoints (e.g., host 640 and storage subsystem 650) each register with the CDC 615. In one or more embodiments, the endpoints may register (652 and 656) using an NVMe connect command. After receiving the NVMe connect commands, the CDC 615 may perform one or more CDC-related functions related to registering the endpoints and zoning (e.g., adding endpoint identifier(s) to registration database, configuring zoning database(s), etc.).

The MVS 625 may poll (660) the CDC for endpoint (i.e., the host and subsystem) information. The information may include identifier(s) of the endpoints and zoning information about which endpoints can correspond with which other endpoints. As noted previously, the MVS may perform the step continuously (e.g., according to a schedule, due to a trigger or prompt (e.g., a prompt triggered by a change in the network or a change in information at the CDC), etc.).

As depicted, the MVS 625 may obtain, for each endpoint identified in the prior step, poll (664 and 668) the network fabric to determine where these endpoint devices are connected. That is, the MVS may obtain the endpoint-to-port information from the network switches and use this information to map (670) endpoint identifiers (e.g., NQN/IP address) to the switch network interface. This mapping may be referred to as an endpoint-list-on-port mapping. Note that, in one or more embodiments, the MVS may continually maintain (e.g., loop 662) that mapping.

Finally, as depicted in FIG. 6, the MVS may enable traffic sampling on all network ports identified in the mapping or all network ports. As noted above, this sampling allows the MVS to check for violations of zoning. One skilled in the art shall recognize that the first portions of the methodology of FIG. 6 may be performed by the endpoint monitoring engine 402 and the final portion may be performed by the traffic monitoring engine 404.

Figure 7:
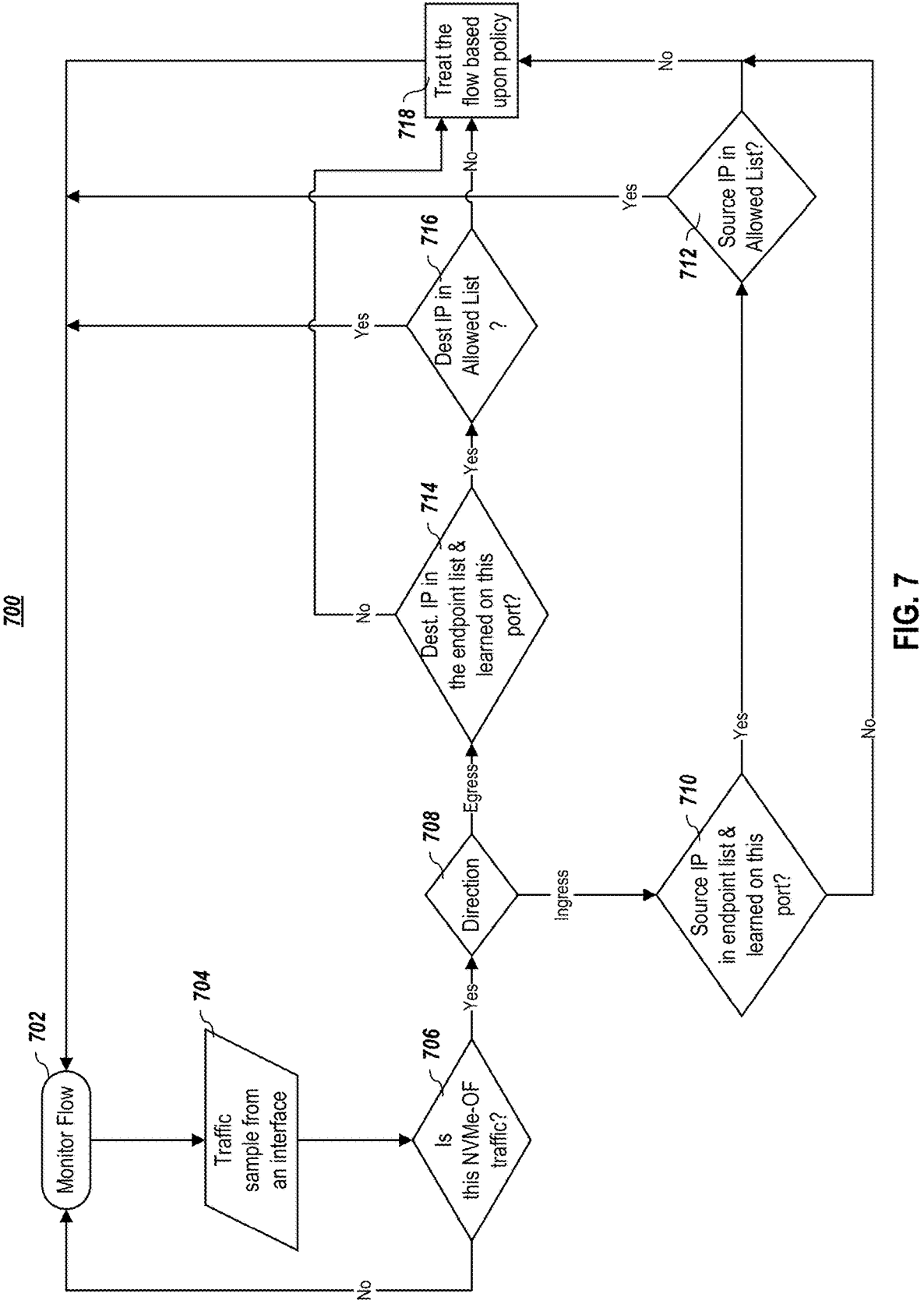
FIG. 7 depicts a methodology for determining whether endpoints involved in a data traffic flow are authorized to correspond, according to embodiments of the present disclosure.

FIG. 7 depicts a methodology for determining whether endpoints involved in a data traffic flow are authorized to correspond, according to embodiments of the present disclosure. The depicted methodology commences by the MVS (e.g., the traffic monitoring engine 404) monitoring (702) data traffic flows in the network. Traffic is sampled (704) from an interface at an information handling system (e.g., switch) in the network, which may be sampled by a traffic sampler or agent at the information handling system.

Because the network may be a network that handles mixed traffic (e.g., Local Area Network (LAN) traffic and Storage Area Network (SAN) traffic), the MVS (e.g., the traffic monitoring engine 404 or the inference engine 406) may perform (706) an initial check whether the data traffic flow is NVMe-oF data traffic. Non-NVMe data traffic may have different handling and zoning rules; therefore, determining (706) the type of flow may be important for mixed flow networks. If the data traffic flow is not NVMe-oF data traffic, the MVS may ignore it and continue to monitor (702) data traffic flows. However, if the data traffic flow is NVMe-oF data traffic, the MVS (e.g., the traffic monitoring engine 404 or the inference engine 406) may then determine (708) the directional flow.

Responsive to determining that the NVMe-oF data traffic flow is ingressing, the MVS determines whether the source IP address is approved to receive data from the destination IP address according to zoning information. In one or more embodiments, the MVS (e.g., the inference engine) may determine whether the source IP address is approved to receive data from the destination IP address according to zoning information by first checking (710) whether the source IP address is on the endpoint list obtained from the CDC and that it has been learned on this port (e.g., as part of the mapping process). If it fails either of these conditions, the data traffic flow may be deemed as a violation, and the flow may be treated (718) according to a policy (e.g., one or more treatment actions may be taken by the enforcement engine according to a policy or policies).

If it passes these conditions, the source IP address may be checked (712) against an allowed list (e.g., whether this source IP address is authorized to communication with the destination IP address according to zoning information). If the source IP address is on the allowed list, the data traffic flow continues without intervention and the process continues (702) to monitor data traffic flows.

If the source IP address is not on the allowed list, the data traffic flow may be deemed as a zoning violation, and the flow may be treated (718) according to a set policy (e.g., one or more treatment actions may be taken by the enforcement engine according to a policy or policies).

Responsive to determining that the NVMe-oF data traffic flow is egressing, the MVS determines whether the destination IP address is approved to send data to the source IP address according to zoning information. In one or more embodiments, the MVS (e.g., the inference engine) may determine whether the destination IP address is approved to send data to the source IP address according to zoning information by first checking (714) whether the destination IP address is on the endpoint list obtained from the CDC and that it has been learned on this port (e.g., as part of the mapping). If it fails either of these conditions, the data traffic flow may be deemed as a violation, and the flow may be treated (718) according to a policy (e.g., one or more treatment actions may be taken by the enforcement engine according to a set policy or policies).

If it passes these conditions, the destination IP address may be checked (716) against an allowed list (e.g., whether this destination IP address is authorized to communication with the source IP address according to zoning information). If the destination IP address is on the allowed list, the data traffic flow continues without intervention and the process continues (702) to monitor data traffic flows.

If the destination IP address is not on the allowed list, the data traffic flow may be deemed as a zoning violation, and the flow may be treated (718) according to policy (e.g., one or more treatment actions may be taken by the enforcement engine according to a set policy or policies).

Finally, although not depicted in FIG. 7, in one or more embodiments, for each information handling system of the set of information handling systems in the network that had a configuration change made as a result of one or more actions being taken relative to a zoning violation configuration, the MVS may cause the configuration change(s) to be reverted according to a policy or policies (e.g., timeout policies) or manually via administrative configuration.

C. Additional Embodiments

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 8:
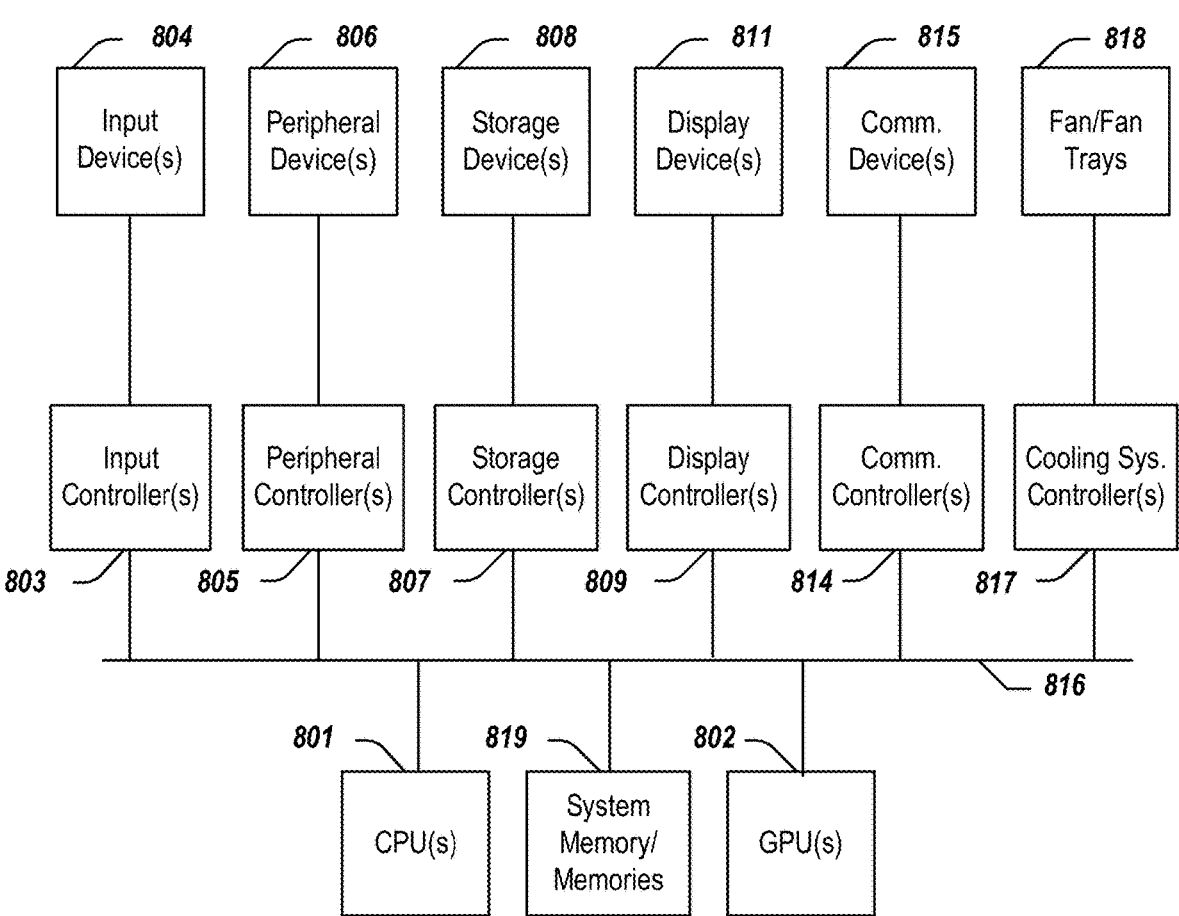
FIG. 8 depicts a simplified block diagram of an information handling system, according to embodiments of the present disclosure.

FIG. 8 depicts a simplified block diagram of an information handling system (or computing system), according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more CPUs 801 that provides computing resources and controls the computer. CPU 801 may be implemented with a microprocessor or the like and may also include one or more graphics processing units (GPU) 802 and/or a floating-point coprocessor for mathematical computations. In one or more embodiments, one or more GPUs 802 may be incorporated within the display controller 809, such as part of a graphics card or cards. The system 800 may also include a system memory 819, which may comprise RAM, ROM, or both.

A number of controllers and peripheral devices may also be provided, as shown in FIG. 8. An input controller 803 represents an interface to various input device(s) 804, such as a keyboard, mouse, touchscreen, stylus, microphone, camera, trackpad, display, etc. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present disclosure. Storage device(s) 808 may also be used to store processed data or data to be processed in accordance with the disclosure. The system 800 may also include a display controller 809 for providing an interface to a display device 811, which may be a cathode ray tube (CRT) display, a thin film transistor (TFT) display, organic light-emitting diode, electroluminescent panel, plasma panel, or any other type of display. The computing system 800 may also include one or more peripheral controllers or interfaces 805 for one or more peripherals 806. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, a Fibre Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 800 comprises one or more fans or fan trays 818 and a cooling subsystem controller or controllers 817 that monitors thermal temperature(s) of the system 800 (or components thereof) and operates the fans/fan trays 818 to help regulate the temperature.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Figure 9:
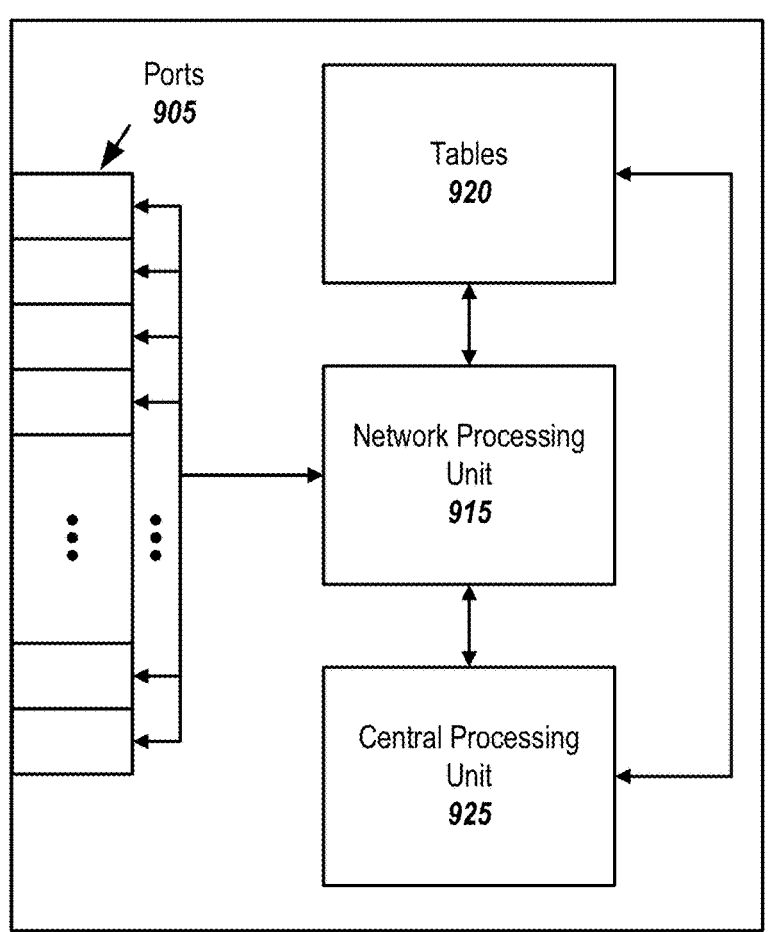
FIG. 9 depicts an alternative block diagram of an information handling system, according to embodiments of the present disclosure.

FIG. 9 depicts an alternative block diagram of an information handling system, according to embodiments of the present disclosure. It will be understood that the functionalities shown for system 900 may operate to support various embodiments of the present disclosure—although it shall be understood that such system may be differently configured and include different components, additional components, or fewer components.

The information handling system 900 may include a plurality of I/O ports 905, a network processing unit (NPU) 915, one or more tables 920, and a CPU 925. The system includes a power supply (not shown) and may also include other components, which are not shown for sake of simplicity.

In one or more embodiments, the I/O ports 905 may be connected via one or more cables to one or more other network devices or clients. The network processing unit 915 may use information included in the network data received at the node 900, as well as information stored in the tables 920, to identify a next device for the network data, among other possible activities. In one or more embodiments, a switching fabric may then schedule the network data for propagation through the node to an egress port for transmission to the next destination.

Aspects of the present disclosure may be encoded upon one or more non-transitory computer-readable media comprising one or more sequences of instructions, which, when executed by one or more processors or processing units, causes steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A processor-implemented method for zoning in a storage network environment, the method comprising:
   collecting zoning information regarding zoning of endpoints in the network;
   monitoring connection data of a set of information handling system in the network to generate a mapping that correlates an endpoint identifier to an information handling system's port to which that endpoint connects;
   from each information handling system of the set of information handling systems, receiving information about data traffic handled by the information handling system; and
   based upon at least a portion of the collected information received from one or more of the information handling systems from the set of information handling systems:
      determining whether endpoints involved in the data traffic are authorized to correspond according to the zoning information; and
      responsive to a zoning violation being detected in which two endpoints are corresponding but are not authorized to correspond according to the zoning information, taking one or more actions related to the zoning violation.

2. The processor-implemented method of claim 1 wherein the step of collecting zoning information regarding zoning of endpoints in the network comprises:
   monitoring zoning information maintained at a centralized discovery controller (CDC) for any changes to zoning in the network; and
   responsive to detecting changes, updating information at a monitoring and visibility services controller to reflect the changes to zoning in the network.

3. The processor-implemented method of claim 1 wherein the step of monitoring connection data of a set of information handling system in the network to generate a mapping that correlates an endpoint identifier to an information handling system's port to which that endpoint connects comprises:

continually monitoring the connection data of the set of information handling system in the network; and responsive to detecting changes, updating information at a monitoring and visibility services controller to reflect the changes to zoning.

4. The processor-implemented method of claim 1 wherein the collected information comprises header information.

5. The processor-implemented method of claim 1 wherein the step of monitoring connection data of a set of information handling system in the network to generate a mapping that correlates an endpoint identifier to an information handling system's port to which that endpoint connects comprises:

obtaining information from one or more Address Resolution Protocol (ARP) tables.

6. The processor-implemented method of claim 1 wherein the step taking one or more actions related to the zoning violation comprising performing one or more actions comprising:

denying data traffic flow between two endpoints that are not authorized to correspond according to the zoning information;

flagging data traffic flow between two endpoints that are not authorized to correspond according to the zoning information; and causing fencing to be implemented to disable a port of an information handling system that is used in data traffic flow between two endpoints that are not authorized to correspond according to the zoning information.

7. The processor-implemented method of claim 1 wherein the step of determining whether endpoints involved in the data traffic are authorized to correspond according to the zoning information comprises:

responsive to determining that the data traffic comprises an NVMe-OF data traffic flow, in which the NVMe-OF data traffic flow comprises a source IP address associated with a first endpoint and a destination IP address associated with a second endpoint:

determining whether the NVMe-OF data traffic flow is egressing or ingressing;

responsive to the NVMe-OF data traffic flow being egressing:

determining whether the destination IP address is approved to receive data from the source IP address according to zoning information; and responsive to the destination IP address not being approved to receive data from the source IP address according to zoning information, taking one or more actions relative to the NVMe-OF data traffic flow between the first endpoint and the second endpoint; and responsive to the NVMe-OF data traffic flow being ingressing:

determining whether the source IP address is approved to send data to the destination IP address according to zoning information; and responsive to the source IP address not being approved to send data to the destination IP address according to zoning information, taking one or more actions relative to the NVMe-OF data traffic flow between the first endpoint and the second endpoint.

8. The processor-implemented method of claim 1 further comprising:

for each information handling system of the set of information handling systems in the network that had a configuration change made as a result of one or more actions being taken relative to the zoning violation, causing the configuration change to be reverted according to a policy.

9. One or more information handling systems configured for monitoring and visibility services (MVS) for zoning in a network, the one or more information handling systems collectively comprising:

one or more processors; and a non-transitory computer-readable medium or media comprising one or more sets of instructions which, when executed by at least one of the one or more processors, causes steps to be performed comprising:

collecting zoning information regarding zoning of endpoints in the network;

monitoring connection data of a set of information handling system in the network to generate a mapping that correlates an endpoint identifier to an information handling system's port to which that endpoint connects;

from each information handling system of the set of information handling systems, receiving information about data traffic handled by the information handling system; and based upon at least a portion of the collected information received from one or more of the information handling systems from the set of information handling systems:

determining whether endpoints involved in the data traffic are authorized to correspond according to the zoning information; and responsive to a zoning violation being detected in which two endpoints are corresponding but are not authorized to correspond according to the zoning information, taking one or more actions related to the zoning violation.

10. The one or more information handling systems of claim 9 wherein the step of collecting zoning information regarding zoning of endpoints in the network comprises:

monitoring zoning information maintained at a centralized discovery controller (CDC) for any changes to zoning in the network; and responsive to detecting changes, updated information at a monitoring and visibility services controller to reflect the changes to zoning in the network.

11. The one or more information handling systems of claim 9 wherein the step of monitoring connection data of a set of information handling system in the network to generate a mapping that correlates an endpoint identifier to an information handling system's port to which that endpoint connects comprises:

continually monitoring the connection data of the set of information handling system in the network; and responsive to detecting changes, updated information at a monitoring and visibility services controller to reflect the changes to zoning.

12. The one or more information handling systems of claim 9 wherein the step taking one or more actions related to the zoning violation comprising performing one or more actions comprising:

denying data traffic flow between two endpoints that are not authorized to correspond according to the zoning information;

19

20 flagging data traffic flow between two endpoints that are not authorized to correspond according to the zoning information; and causing fencing to be implemented to disable a port of an information handling system that is used in data traffic flow between two endpoints that are not authorized to correspond according to the zoning information.

13. The one or more information handling systems of claim 9 wherein the step of determining whether endpoints involved in the data traffic are authorized to correspond according to the zoning information comprises:

responsive to determining that the data traffic comprises an NVMe-OF data traffic flow, in which the NVMe-OF data traffic flow comprises a source IP address associated with a first endpoint and a destination IP address associated with a second endpoint:

determining whether the NVMe-OF data traffic flow is egressing or ingressing;

responsive to the NVMe-OF data traffic flow being egressing:

determining whether the destination IP address is approved to receive data from the source IP address according to zoning information; and responsive to the destination IP address not being approved to receive data from the source IP address according to zoning information, taking one or more actions relative to the NVMe-OF data traffic flow between the first endpoint and the second endpoint; and responsive to the NVMe-OF data traffic flow being ingressing:

determining whether the source IP address is approved to send data to the destination IP address according to zoning information; and responsive to the source IP address not being approved to send data to the destination IP address according to zoning information, taking one or more actions relative to the NVMe-OF data traffic flow between the first endpoint and the second endpoint.

14. The one or more information handling systems of claim 9 wherein at least one of the non-transitory computer-readable media further comprises one or more sets of instructions which, when executed by at least one of the one or more processors, causes steps to be performed comprising:

for each information handling system of the set of information handling systems in the network that had a configuration change made as a result of one or more actions being taken relative to the zoning violation, causing the configuration change to be reverted according to a policy.

15. A non-transitory computer-readable medium or media comprising one or more sequences of instructions which, when executed by at least one processor, causes steps to be performed comprising:

collecting zoning information regarding zoning of endpoints in a network;

monitoring connection data of a set of information handling system in the network to generate a mapping that correlates an endpoint identifier to an information handling system's port to which that endpoint connects;

from each information handling system of the set of information handling systems, receiving information about data traffic handled by the information handling system; and based upon at least a portion of the collected information received from one or more of the information handling systems from the set of information handling systems:

determining whether endpoints involved in the data traffic are authorized to correspond according to the zoning information; and responsive to a zoning violation being detected in which two endpoints are corresponding but are not authorized to correspond according to the zoning information, taking one or more actions related to the zoning violation.

16. The non-transitory computer-readable medium or media of claim 15 wherein the step of collecting zoning information regarding zoning of endpoints in the network comprises:

monitoring zoning information maintained at a centralized discovery controller (CDC) for any changes to zoning in the network; and responsive to detecting changes, updating information at a monitoring and visibility services controller to reflect the changes to zoning in the network.

17. The non-transitory computer-readable medium or media of claim 15 wherein the step of monitoring connection data of a set of information handling system in the network to generate a mapping that correlates an endpoint identifier to an information handling system's port to which that endpoint connects comprises:

continually monitoring the connection data of the set of information handling system in the network; and responsive to detecting changes, updating information at a monitoring and visibility services controller to reflect the changes to zoning.

18. The non-transitory computer-readable medium or media of claim 15 wherein the step taking one or more actions related to the zoning violation comprising performing one or more actions comprising:

denying data traffic flow between two endpoints that are not authorized to correspond according to the zoning information;

flagging data traffic flow between two endpoints that are not authorized to correspond according to the zoning information; and causing fencing to be implemented to disable a port of an information handling system that is used in data traffic flow between two endpoints that are not authorized to correspond according to the zoning information.

19. The non-transitory computer-readable medium or media of claim 15 wherein the step of determining whether endpoints involved in the data traffic are authorized to correspond according to the zoning information comprises:

responsive to determining that the data traffic comprises an NVMe-oF data traffic flow, in which the NVMe-oF data traffic flow comprises a source IP address associated with a first endpoint and a destination IP address associated with a second endpoint:

determining whether the NVMe-oF data traffic flow is egressing or ingressing;

responsive to the NVMe-oF data traffic flow being egressing:

determining whether the destination IP address is approved to receive data from the source IP address according to zoning information; and responsive to the destination IP address not being approved to receive data from the source IP address according to zoning information, taking one or more actions relative to the NVMe-oF data traffic flow between the first endpoint and the second endpoint; and responsive to the NVMe-oF data traffic flow being ingressing:

determining whether the source IP address is approved to send data to the destination IP address according to zoning information; and responsive to the source IP address not being approved to send data to the destination IP address according to zoning information, taking one or more actions relative to the NVMe-oF data traffic flow between the first endpoint and the second endpoint.

20. The non-transitory computer-readable medium or media of claim 15 further comprising one or more sequences of instructions which, when executed by at least one processor, causes steps to be performed comprising:

for each information handling system of the set of information handling systems in the network that had a configuration change made as a result of one or more actions being taken relative to the zoning violation, causing the configuration change to be reverted according to a policy.

* * * * *